J. JONAS.
HAT STRETCHING MACHINE.
APPLICATION FILED APR. 29, 1920.
1,371,247.
Patented Mar. 15, 1921.
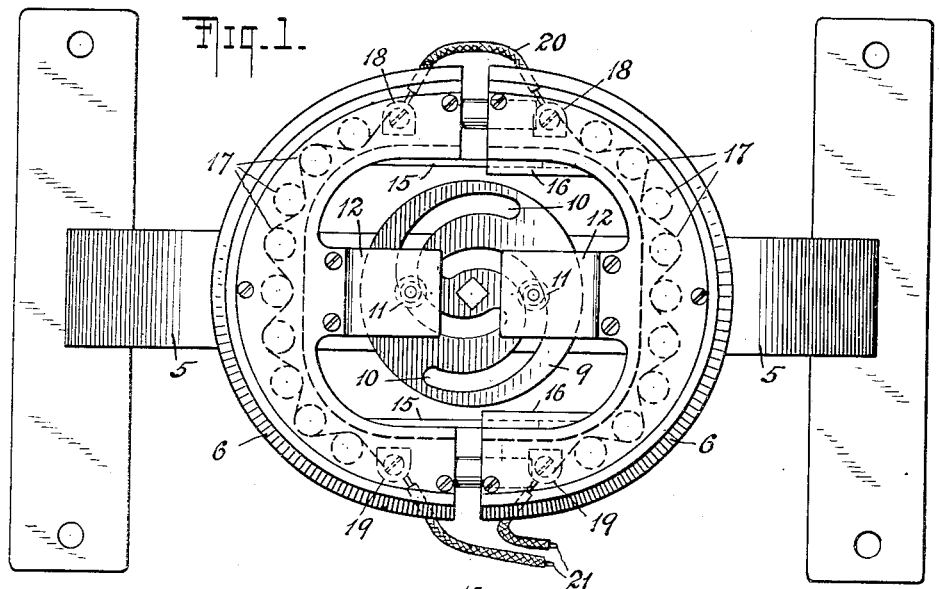
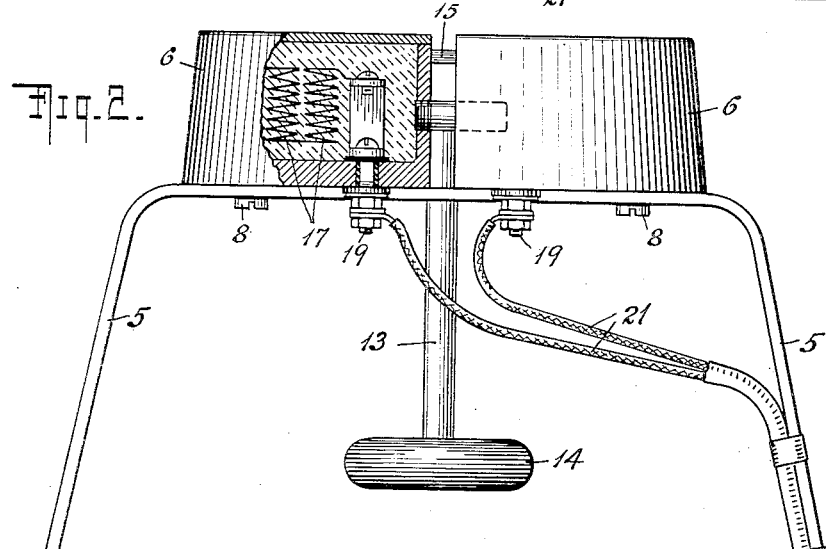
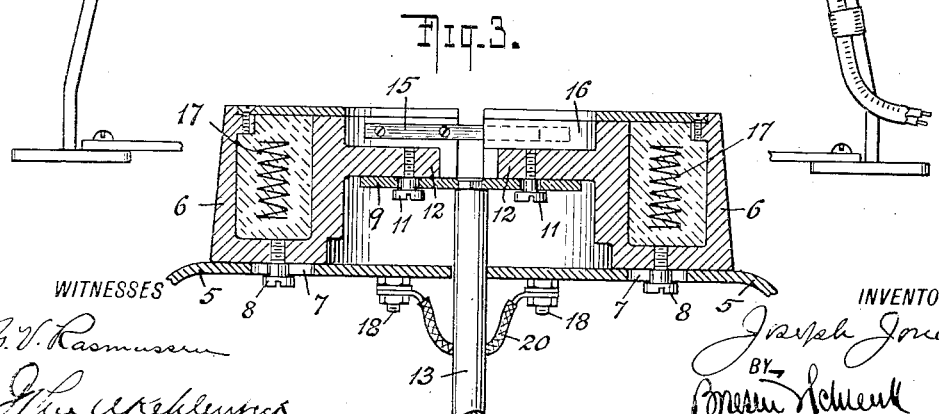
WITNESSES
INVENTOR
Joseph Jonas
BY
ATTORNEYS

UNITED STATES PATENT OFFICE.

JOSEPH JONAS, OF BROOKLYN, NEW YORK.

HAT-STRETCHING MACHINE.

1,371,247.   Specification of Letters Patent.   Patented Mar. 15, 1921.

Application filed April 29, 1920. Serial No. 377,451.

*To all whom it may concern:*

Be it known that I, JOSEPH JONAS, a citizen of the United States, and resident of the borough of Brooklyn, county of Kings, city and State of New York, have invented certain new and useful Improvements in Hat-Stretching Machines, of which the following is a specification.

My invention relates to machines for stretching hats to properly fit the head of the wearer and has for its object to provide a machine of novel construction in which the hat is subjected to the action of heat and softened coincidentally with the stretching operation. Other more specific objects will appear from the description hereinafter and the features of novelty will be pointed out in the appended claims.

In the accompanying drawings, which illustrate an example of my invention without defining its limits, Figure 1 is a plan view of the machine; Fig. 2 is an elevation thereof and Fig. 3 is a sectional elevation on the line 3—3 of Fig. 1.

As shown in the illustrated example the machine comprises a frame or support 5 of suitable construction on which two stretching members 6 are slidably mounted so as to be adjustable toward and away from each other. Any well known means may be provided for guiding said members 6 during their movements; for instance, the frame 5 may be provided with slots 7 for the accommodation of headed screws 8 or the like which depend from said members 6. The means whereby said members 6 are adjusted toward and away from each other may comprise any suitable devices and as shown in the illustrated example may consist of a disk 9 provided with cam slots 10 into which rollers carried on lugs 11 extend. The latter project downwardly from brackets 12 carried by the members 6 as shown in Fig. 3. The disk 9 is mounted upon an upright shaft 13 journaled on the frame 5 and provided at its lower end with a hand wheel 14 whereby said shaft 13 and with it the cam disk 9 are manipulated. In order to steady the movements of the members 6 relatively to each other, they may be provided respectively with coöperating guiding members 15 and 16 having telescopic engagement or its equivalent, with each other as shown in Fig. 1.

The members 6 are constructed in the form of hollow chambers and preferably of a metal which is a good conductor of heat. Within said hollow members 6 are located a plurality of electric heating devices 17 connected in series and with terminals 18 and 19. The terminals 18 are connected by means of a wire 20 sufficiently slack to permit the maximum adjustment of said members 6 away from each other and the terminals 19 are connected with wires 21 which in turn lead to a plug of any well known type whereby said heating devices 17 may be connected with a source of electricity. It will, of course, be understood that, if desired, heating devices of types other than those shown and operated otherwise than by electricity, may be substituted without affecting the efficiency of the machine.

In using the machine the electrical current is turned on to energize the heating devices 17 and the hat to be stretched is placed upon and over the members 6. The hand wheel 14 is then actuated to rotate the cam disk 9 in a direction to separate the members 6, the manipulation of the hand wheel being continued until the hat is under the tension necessary to produce the desired stretch. During this stretching operation the application of the heat to the hat softens the material of which it is made and thus makes the stretching more efficient and at the same time permanent as the hat material cools off.

The machine is extremely efficient and reliable in operation, is simple in construction and requires no specially skilled attention in its operation.

Various changes in the specific form shown and described may be made within the scope of the claims without departing from the spirit of my invention.

I claim:

1. A hat stretching machine comprising a support, a plurality of stretching members movably mounted thereon, means for actuating said members in directions to exert a stretching force and means carried by said members for heating the same.

2. A hat stretching machine comprising a support, a plurality of hollow stretching members movably mounted therein, means for actuating said members and means within said members for heating the same.

3. A hat stretching machine comprising a support, a pair of hollow stretching members slidably mounted thereon and adjustable toward and away from each other, means for actuating said members and electrically operated devices within said members for heating the same.

4. A hat stretching machine comprising a support, a pair of hollow stretching members slidably mounted thereon and adjustable toward and away from each other, a cam disk operatively connected with said members, means for operating said cam disk to move said members relatively to each other and electrically operated devices within said members for heating the same.

In testimony whereof I have hereunto set my hand.

JOSEPH JONAS.